US007020491B2

(12) United States Patent
Kobayashi

(10) Patent No.: US 7,020,491 B2
(45) Date of Patent: Mar. 28, 2006

(54) MOBILE COMMUNICATION SYSTEM, BASE STATION CONTROL DEVICE AND RADIO BASE STATION FORMING THE SAME, AND COMMUNICATION TIMING CONTROL METHOD THEREOF

(75) Inventor: Kazunari Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 462 days.

(21) Appl. No.: 10/435,589

(22) Filed: May 12, 2003

(65) Prior Publication Data

US 2003/0216155 A1 Nov. 20, 2003

(30) Foreign Application Priority Data

May 14, 2002 (JP) ............................. 2002-138016

(51) Int. Cl.
*H04B 1/38* (2006.01)
*H04M 1/00* (2006.01)

(52) U.S. Cl. ..................... 455/561; 455/560; 455/503

(58) Field of Classification Search ................ 455/561, 455/466, 500, 503, 502, 560, 435.1, 445, 455/446, 453, 524, 525; 370/320, 321, 335, 370/342, 441, 468, 442, 336, 337
See application file for complete search history.

(56) References Cited

U.S. PATENT DOCUMENTS

| 6,308,073 | B1 * | 10/2001 | Petty et al. | ............... | 455/456.3 |
| 6,571,098 | B1 * | 5/2003 | Endou | ........................ | 455/436 |
| 6,728,233 | B1 * | 4/2004 | Park et al. | .................. | 370/342 |
| 6,760,305 | B1 * | 7/2004 | Pasternak et al. | ........... | 370/230 |
| 2004/0002341 | A1 * | 1/2004 | Chen | .......................... | 455/453 |
| 2005/0157679 | A1 * | 7/2005 | Dulin et al. | ................ | 370/330 |

FOREIGN PATENT DOCUMENTS

| JP | 2001-16159 | 1/2001 |
| JP | 2001-333446 | 11/2001 |
| JP | 2001-358638 | 12/2001 |

* cited by examiner

*Primary Examiner*—Edan Orgad
(74) *Attorney, Agent, or Firm*—Young & Thompson

(57) ABSTRACT

Among a plurality of radio base stations, to a radio base station whose transmission delay time between a base station control device and its own station will be the longest, down data from the base station control device is transmitted to have a buffering time of zero, while to the other radio base stations, data is transmitted with a buffering time corresponding to the degree of relative shortness of a transmission delay time applied, and the buffering time is modified by monitoring a change of a difference in delay time of up data from the radio base station.

10 Claims, 17 Drawing Sheets

MOBILE COMMUNICATION SYSTEM, BASE STATION CONTROL DEVICE AND RADIO BASE STATION FORMING THE SAME, AND COMMUNICATION TIMING CONTROL METHOD THEREOF

BACKGROUND OF THE INVENTION

1. Field of the Invention

The present invention relates to a mobile communication system such as a cellular phone, a base station control device and a radio base station forming the system, and a communication timing control method in the system.

2. Description of the Related Art

Mobile communication system whose representative is a cellular phone or a PHS is an information communication means indispensable in the information age of today. The mobile communication is realized by transmission and reception of radio signals by a mobile terminal to and from a radio base station and transmission and reception of wire signals by the radio base station to and from a network connecting to a communication target. Since one radio base station has its communicable area limited, a plurality of radio base stations form an area (cell) covering communication to compensate for each other, thereby enabling mobile communication everywhere. In a case where a mobile terminal conducts communication, it uses a radio base station responsible for communication in a cell to which it belongs. When the mobile terminal comes out of the area of the cell to which it originally belongs to move to other cell during communication, there arises the need of communication using a radio base station existing in the cell to which it has moved. At this time, if the terminal is allowed to use only one radio base station, communication is instantaneously cut off at the instant of switching to a radio base station to be used. For avoiding such problem, mobile communication systems of today employ a method of preventing communication from cutting off even when a mobile terminal moves among cells by enabling the mobile terminal to simultaneously communicate with a plurality of radio base stations when the mobile terminal is located near the boundaries of a plurality of cells.

For enabling this method, a plurality of radio base stations existing near a terminal should receive user data and timing should be controlled such that data from each radio base station to the terminal arrives at the terminal at the same time. A base station control device in general takes charge of this control and upon receiving user data to the terminal, the base station control device copies the data and controls timing of transmission to each radio base station such that the user data arrives at the plurality of radio base stations at the same time.

FIG. 13 is a conceptual diagram showing a relationship among a base station control device, a radio base station and a terminal in a common mobile communication system.

In FIG. 13, in the mobile communication system, user data C from a core network 1 is received by a base station control device 2, the received user data C is transmitted from the base station control device 2 to a plurality of radio base stations 3 (3-1, 3-2, 3—3) and user data B in question is sent from the plurality of radio base stations 3-1, 3-2 and 3—3 as user data A by radio, whereby the user data is transmitted from the relevant radio base station 3 to a mobile terminal 4.

In the above-described mobile communication system, for conducting communication timing control, the base station control device 2 in advance defines, as a fixed value, a time from the reception of the user data C by the base station control device 2 until the transmission of the user data as the user data A by the radio base station 3 by radio (the time period will be hereinafter referred to as a total delay time in RAN). In addition, at the start of communication, calculate the amount of transmission delay corresponding to a time period of data transmission between the base station control device 2 and the respective radio base stations 3-1, 3-2 and 3—3. Upon receiving the user data C from the core network 1, the base station control device 2 determines timing of transmitting user data to the respective radio base stations 3-1, 3-2 and 3—3 according to the following expression:

(transmission time)=(reception time)+(total delay time in RAN)−(the amount of transmission delay between the base station control device and the radio base station).

With this timing control method, when the amount of transmission delay is small, the base station control device 2 needs to buffer user data for a time period approximate to a total delay time in RAN, which might invite an increase in the total amount of delay of the entire system. In addition, when the amount of transmission delay between the base station control device 2 and the radio base station 3 changes due to handover or the like, the radio base station 3 senses deviation of user data reception timing to instruct the base station control device 2 to modify transmission timing, thereby realizing timing modification. For realizing such control, however, timing should be synchronized between the radio base station 3 and the base station control device 2 and the radio base station 3 needs to monitor normality of timing of data reception from the base station control device 2 all the time.

Conventional timing control method will be more detailed with reference to the drawings. First, at the time of communication start, timing is adjusted such that user data simultaneously arrives at all the radio base stations 3 (3-1, 3-2, 3—3) taking the amount of transmission delay between the base station control device 2 and the respective radio base stations 3-1, 3-2 and 3—3 into consideration.

FIG. 14 is a timing chart showing a conventional timing control method at the time of communication start.

Timing is adjusted such that at the respective radio base stations 3-1, 3-2 and 3—3 connected with the base station control device 2 through a transmission path (cable), a relationship between a sequence number applied to a frame (hereinafter referred to as CFN) and radio transmission timing of frame is the same.

To the respective radio base stations 3-1, 3-2 and (3—3), the base station control device 2 transmits a synchronous frame with a CFN appropriately applied. Each of the radio base stations 3-1, 3-2 and (3—3) having received the synchronous frames transmitted from the base station control device 2 responds to the base station control device 2 with a time difference between the time when it received the synchronous frame and timing when a frame having the CFN applied to the synchronous frame is transmitted.

Based on the difference received from each of the radio base stations 3-1, 3-2 and 3—3, the base station control device 2 adjusts a relationship between the CFN to be applied to the frame and the frame transmission timing and adjusts user data sending timing such that the frame arrives meeting the CFN transmission timing of each of the radio base stations 3-1, 3-2 and 3—3.

FIG. 15 is a timing chart showing timing of transmission of user data to each of the radio base stations 3-1, 3-2 and 3—3 at the time of down frame reception in the conventional method.

As a fixed value, determine in advance the above-described total delay time in RAM from when the base station control device 2 receives user data from the core network 1 until when the radio base stations 3-1, 3-2 and 3—3 transmit the user data by radio.

Upon receiving the user data from the core network 1, the base station control device 2 adjusts timing of transmission of user data to each of the radio base stations 3-1, 3-2 and 3—3, that is, each buffering time to be applied, such that the user data arrives at the radio base stations 3-1, 3-2 and 3—3 after a lapse of the total delay time in RAM after the reception of the user data.

When the amount of transmission delay between the base station control device 2 and the radio base stations 3-1, 3-2 and 3—3 changes due to hard handover or the like, timing is modified.

FIGS. 16 and 17 are timing charts showing the conventional timing control method at the time of modifying the timing. FIG. 16 shows a state before the timing is modified, while FIG. 17 shows a state after the timing is modified.

The radio base stations 3-1, 3-2 and 3—3 have a window having a fixed time span for each CFN transmission timing and when receiving a frame which can not be accommodated in the window, report deviation from the window to the base station control device 2.

Upon receiving the report, the base station control device 2 adjusts timing of user data transmission to the radio base station 3 by as much as the deviation from the window.

As described in the foregoing, since in such a conventional timing control method as described above, time is defined in advance from when the base station control device 2 receives data until when the radio base station 3 transmits the data and based on the time, a buffering time of the base station control device 2 is determined, data should be buffered for a long period of time at the base station control device.

In addition, since timing control between the radio base station and the base station control device is complicated to make it difficult to reduce a delay time of user data transmission in the system as a whole.

Under these circumstances, proposed for a mobile communication system in which a signal processing device is provided between a base station control device and a core network are the technique (Japanese Patent Laying-Open (Kokai) No. 2001-333446) of preventing deterioration of communication quality by reducing time of delay in transmission from the base station control device to the signal processing device, thereby reducing the number of user frames aborted due to delayed arrival and the techniques (Japanese Patent Laying-Open (Kokai) No. 2001-16159 and Japanese Patent Laying-Open (Kokai) No. 2001-358638) of maintaining communication quality by measuring a signal propagation time (transmission delay time) of a signal between a mobile station moving fast and a radio base station and conducting appropriate control according to the measurement result.

These techniques, however, fail to have an intention to suppress an increase in the scale of the base station control device, while reducing a user data transmission time in the system as a whole by reducing a user data (frame) buffering time in the base station control device.

SUMMANRY OF THE INVENTION

Accordingly, an object of the present invention is to provide a mobile communication system, a base station control device and a radio base station forming the system, and a communication timing control method in the system which enable an increase in load and scale of the base station control device to be suppressed, as well as enabling reduction in a user data transmission time in the system as a whole by reducing a data buffering time in the base station control device.

According to the first aspect of the invention, a mobile communication system in which user data from a core network is received by a base station control device, the received user data is transmitted from the base station control device to a plurality of radio base stations and the user data is sent out by radio from these plurality of radio base stations to transmit the user data to a mobile terminal from the relevant radio base station, wherein the base station control device is structured to, at the time of communication start, transmit test data to each the radio base station, receives, from each radio base station, a response signal related to the transmitted test data, based on time of the transmission and time of reception of each response from each the radio base station, calculate the amount of transmission delay corresponding to a data transmission time between its own device and each radio base station in question and based on each calculated amount of transmission delay, with one radio base station whose the amount of transmission delay is the largest as a reference, calculate a transmission data buffering time to be applied to each radio base station to be substantially zero or extremely short for the one radio base station in question and to be a finite value conforming to a relative relationship with the amount of transmission delay of the one radio base station for each of the other radio base stations, at the time of transmitting down data supplied from the core network, transmit the data to each corresponding radio base station with each the calculated buffering time applied, and at the time of receiving up data from each the radio base station, based on a change of a difference in time of data reception from each radio base station, adjust a buffering time to be applied, and each the radio base station is structured to, at the time of communication start, upon receiving the test data from the base station control device, transmit the response signal to the base station control device in question with substantially no delay.

In the preferred construction, the base station control device executes adjustment of a buffering time all the time which is conducted based on a change of a difference in time of data reception from each radio base station when receiving up data from each the radio base station.

In another preferred construction, the base station control device executes adjustment of a buffering time in a fixed cycle which is conducted based on a change of a difference in time of data reception from each radio base station when receiving up data from each the radio base station.

According to the second aspect of the invention, a base station control device forming a mobile communication system designed such that user data from a core network is received by the base station control device, the received user data is transmitted from the base station control device to a plurality of radio base stations and the user data is sent out by radio from these plurality of radio base stations to transmit the user data to a mobile terminal from the relevant radio base station, which is structured to:

at the time of communication start, transmit test data to each the radio base station, receive, from each radio base station, a response signal related to the transmitted test data, based on time of the transmission and time of reception of each response from each the radio base station, calculate the amount of transmission delay corresponding to a data transmission time between its own device and each radio base station in question and based on each calculated amount of transmission delay, with one radio base station whose the amount of transmission delay is the largest as a reference, calculate a transmission data buffering time to be applied to each radio base station to be substantially zero or extremely short for the one radio base station in question and to be a finite value conforming to a relative relationship with the amount of transmission delay of the one radio base station for each of the other radio base stations, at the time of transmitting down data supplied from the core network, transmit the data to each corresponding radio base station with each the calculated buffering time applied, and at the time of receiving up data from each the radio base station, based on a change of a difference in time of data reception from each radio base station, adjust a buffering time to be applied.

In the preferred construction, the base station control device executes adjustment of a buffering time all the time which is conducted based on a change of a difference in time of data reception from each radio base station when receiving up data from each the radio base station.

In another preferred construction, the base station control device executes adjustment of a buffering time in a fixed cycle which is conducted based on a change of a difference in time of data reception from each radio base station when receiving up data from each the radio base station.

According to the third aspect of the invention, A radio base station forming a mobile communication system, wherein in the mobile communication system, user data from a core network is received by a base station control device, the received user data is transmitted from the base station control device to a plurality of radio base stations and the user data is sent out by radio from these plurality of radio base stations to transmit the user data to a mobile terminal from the relevant radio base station, the base station control device, at the time of communication start, transmits test data to each the radio base station, receives, from each radio base station, a response signal related to the transmitted test data, based on time of the transmission and time of reception of each response from each the radio base station, calculates the amount of transmission delay corresponding to a data transmission time between its own device and each radio base station in question and based on each calculated amount of transmission delay, with one radio base station whose the amount of transmission delay is the largest as a reference, calculates a transmission data buffering time to be applied to each radio base station to be substantially zero or extremely short for the one radio base station in question and to be a finite value conforming to a relative relationship with the amount of transmission delay of the one radio base station for each of the other radio base stations, at the time of transmitting down data supplied from the core network, transmits the data to each corresponding radio base station with each the calculated buffering time applied, and at the time of receiving up data from each the radio base station, based on a change of a difference in time of data reception from each radio base station, adjusts a buffering time to be applied, and the radio base station, at the time of communication start, upon receiving the test data from the base station control device, transmits the response signal to the base station control device in question with substantially no delay.

According to another aspect of the invention, a communication timing control method in a mobile communication system structured such that user data from a core network is received by a base station control device, the received user data is transmitted from the base station control device to a plurality of radio base stations and the user data is sent out by radio from these plurality of radio base stations to transmit the user data to a mobile terminal from the relevant radio base station, comprising the steps of:

in the base station control device, at the time of communication start, transmitting test data to each the radio base station, in each the radio base station, upon receiving the test data, transmitting a response signal to the base station control device with substantially no delay, in the base station control device, receiving the response signal from each the radio base station, in the base station control device, based on time of the transmission and time of reception of each response from each the radio base station, calculating the amount of transmission delay corresponding to a data transmission time between its own device and each radio base station in question, in the base station control device, based on each calculated amount of transmission delay, with one radio base station whose the amount of transmission delay is the largest as a reference, calculating a transmission data buffering time to be applied to each radio base station to be substantially zero or extremely short for the one radio base station in question and to be a finite value conforming to a relative relationship with the amount of transmission delay of the one radio base station for each of the other radio base stations, in the base station control device, at the time of transmitting down data supplied from the core network, transmitting the data to each corresponding radio base station with each the calculated buffering time applied, and in the base station control device, at the time of receiving up data from each the radio base station, based on a change of a difference in time of data reception from each radio base station, adjusting a buffering time to be applied.

In the preferred construction, in the base station control device, when receiving up data from each the radio base station, the step of adjusting a buffering time to be applied based on a change of a difference in time of data reception from each radio base station is executed all the time.

In another preferred construction, in the base station control device, when receiving up data from each the radio base station, the step of adjusting a buffering time to be applied based on a change of a difference in time of data reception from each radio base station is executed in a fixed cycle.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the following, detailed description will be made of a preferred mode of implementation of a mobile communication system, a base station control device and a radio base station forming the system, and a communication timing control method in the system according to the present invention.

Figure 3:
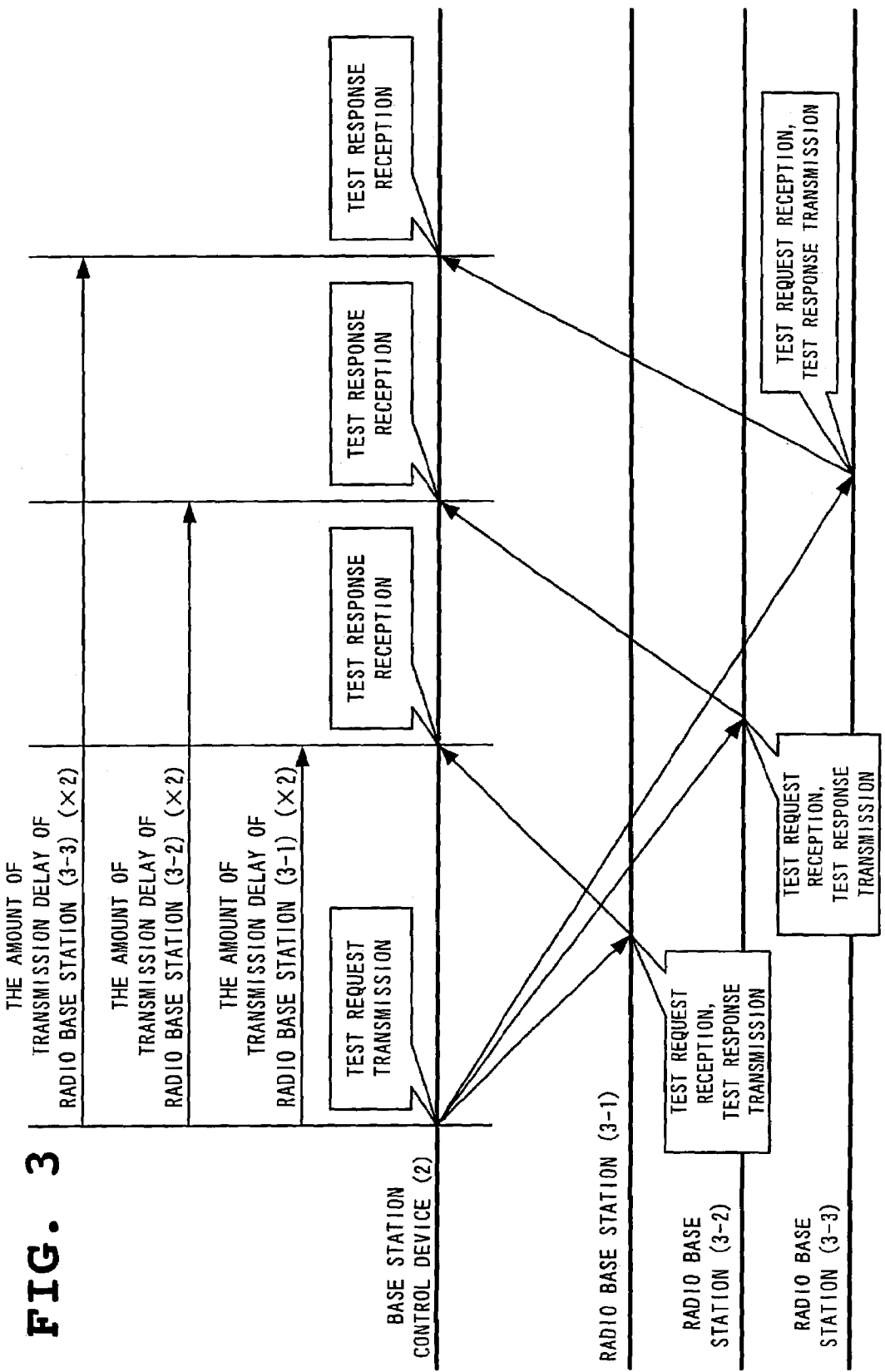
FIG. 3 is a timing chart showing the timing control method at the time of communication start according to the present invention.

FIG. 3 is a timing chart showing a timing control method at the time of communication start according to the present invention.

The base station control device 2 transmits test data to the respective radio base stations 3-1, 3-2 and 3—3.

Upon receiving the test data, the radio base stations 3-1, 3-2 and 3—3 immediately return a response to the base station control device 2 with substantially no delay without conducting any processing.

The base station control device 2 calculates the amount of transmission delay between the base station control device 2 and the radio base stations 3-1, 3-2 and 3—3 from a time cost from test data transmission until response reception.

Upon completion of the calculation of the amount of transmission delay of each of all the radio base stations 3-1, 3-2 and 3—3, calculate a buffering time that the base station control device 2 has to have related to transmission data to the respective radio base stations 3-1, 3-2 and 3—3 such that user data reception time of each of all the radio base stations 3-1, 3-2 and 3—3 is the same.

Figure 4:
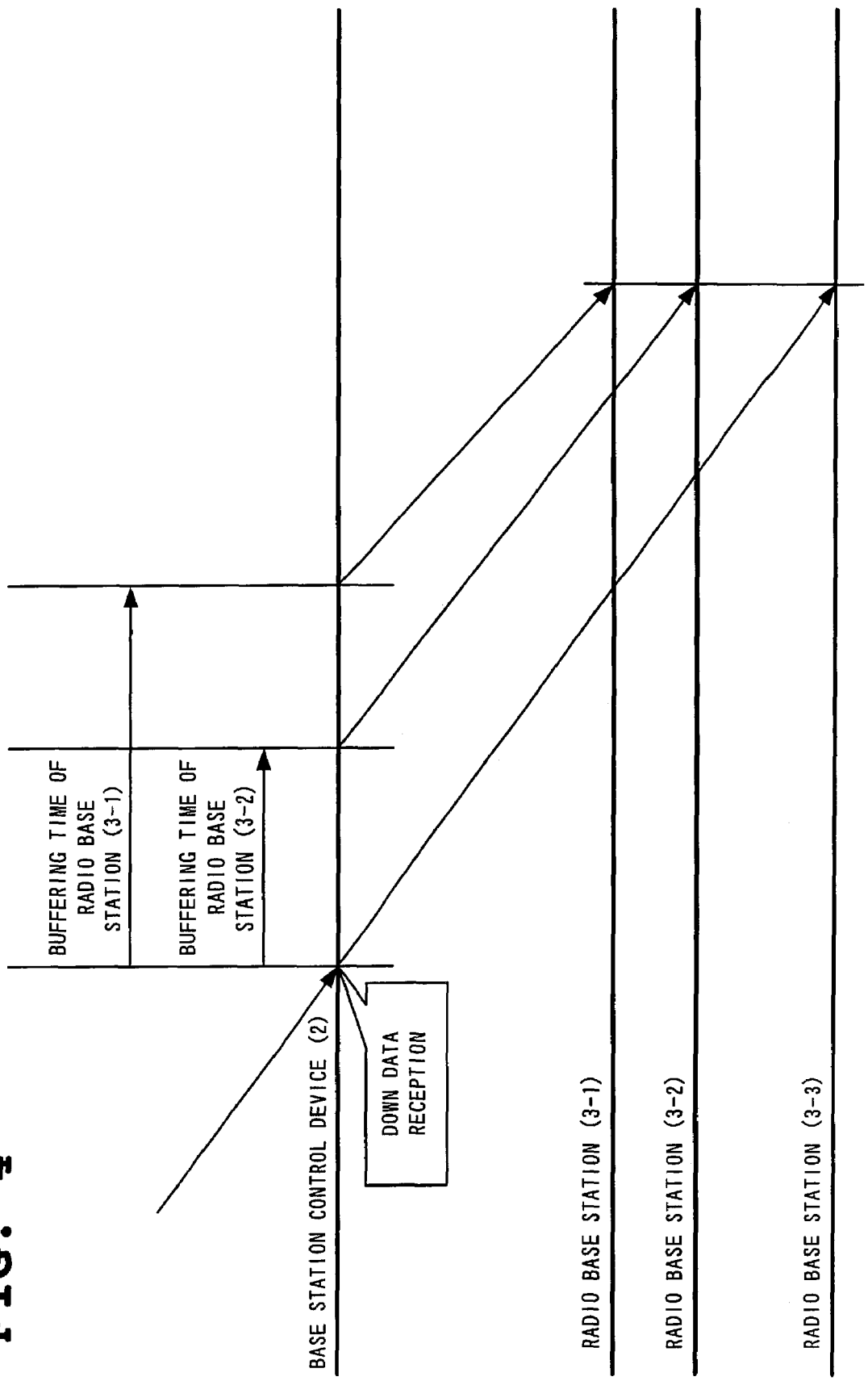
FIG. 4 is a timing chart showing timing of user data transmission to each radio base station at the time of down frame reception in the method according to the present invention.

FIG. 4 is a timing chart showing timing of user data transmission to the respective radio base stations 3-1, 3-2 and 3—3 at the time of down frame reception in the method according to the present invention.

Upon receiving user data, the base station control device 2 instantaneously transmits the user data to the radio base station 3—3 having the largest amount of transmission delay. In other words, for one radio base station 3—3, set a transmission data buffering time to be applied to each radio base station to be substantially zero or very short with the one radio base station 3—3 whose amount of transmission delay is the largest as a reference.

Adjust a frame buffering time at each of the other radio base stations 3-2 and 3-1 with the above one radio base station 3—3 as a reference such that user data reception timing of all the radio base stations 3-1, 3-2 and 3—3 is the same and transmit the user data to the radio base stations 3-2 and 3-1 to which the data is yet to be sent. More specifically, calculate each value as a finite value based on a relative relationship with the above amount of transmission delay (maximum value) of the above one radio base station and regard the calculated value as a frame buffering time related to each radio base station. Qualitatively speaking with respect to the three radio base stations in the above-described example, a buffering time applied related to one radio base station 3—3 whose calculated amount of transmission delay is the largest will be the shortest (substantially 0), a buffering time applied related to the radio base station 3-1 whose calculated amount of transmission delay is the smallest will be the longest and a buffering time applied related to the radio base station 3-2 whose amount of transmission delay has an intermediate value between the two amounts will be an intermediate value between the two buffering times.

Figure 1:
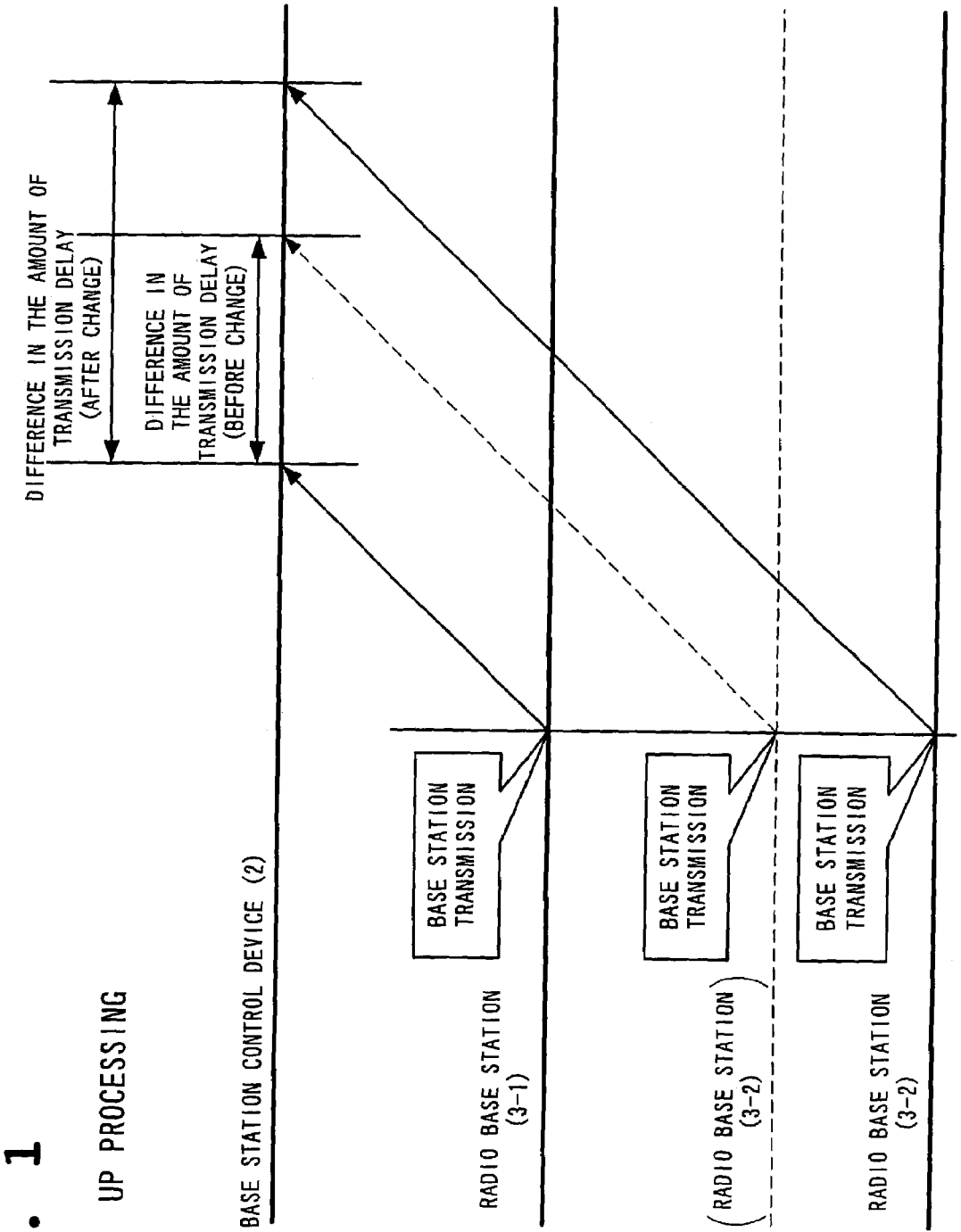
FIG. 1 is a timing chart showing a timing control method at the time of timing modification according to the present invention.
Figure 2:
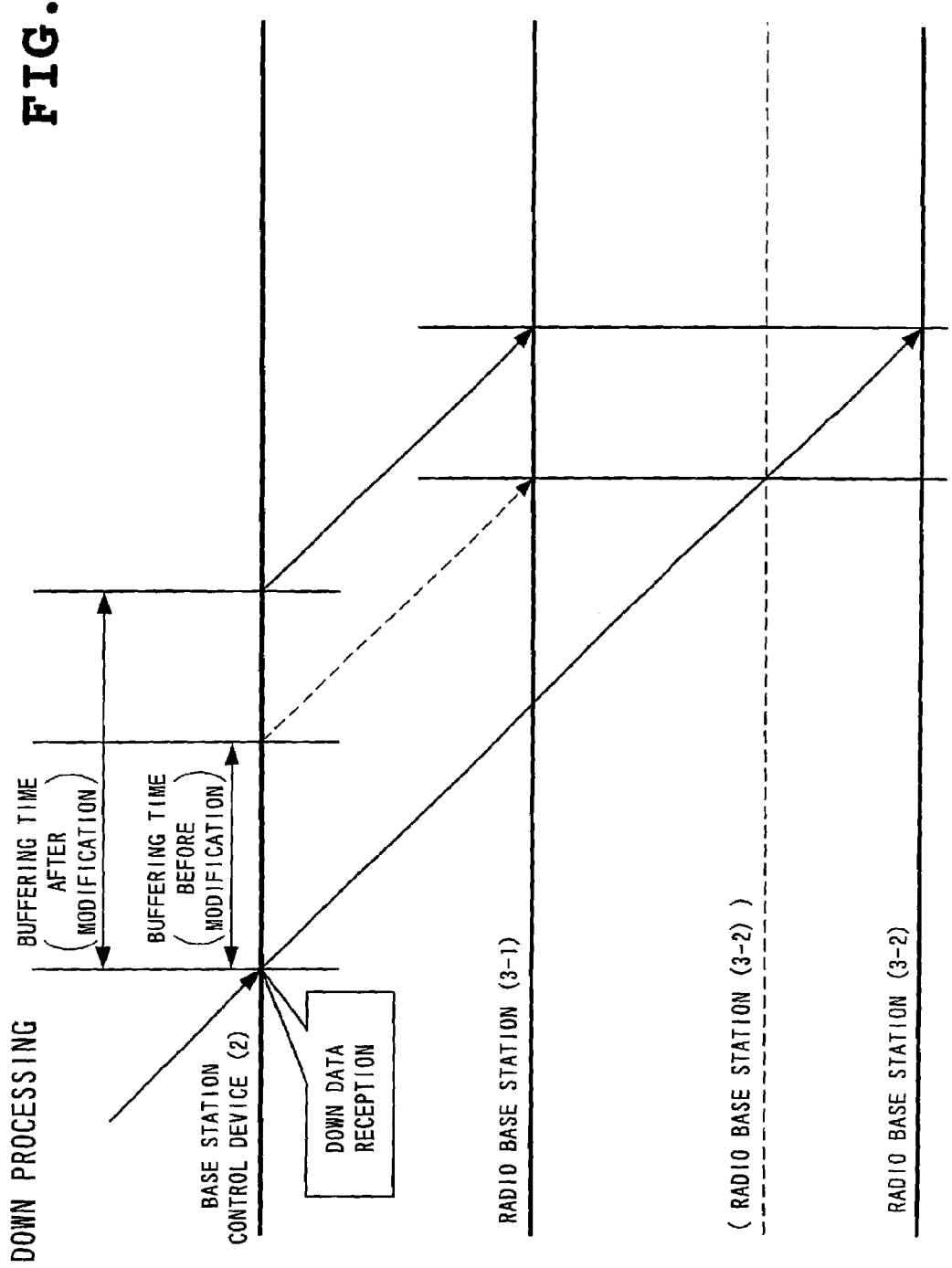
FIG. 2 is a timing chart showing the timing control method at the time of timing modification according to the present invention.

FIGS. 1 and 2 are timing charts showing the timing control method at the time of timing modification according to the present invention. FIG. 1 shows timing control in an up direction, while FIG. 2 shows timing control in a down direction.

As is already described, timing should be modified when the amount of transmission delay between the base station control device 2 and the base stations 3-1, 3-2 and 3—3 changes due to hard handover or the like.

Detect a change of the amount of transmission delay from a change of a difference in arrival timing of up user data from the respective radio base stations 3-1, 3-2 and 3—3. In the illustrated case (FIG. 1), a change of a difference is recognized between the amount of transmission delay related to the radio base station 3-1 and the amount of transmission delay related to the radio base station 3-2.

Reflect the above-detected change of the amount of transmission delay on down user data transmission timing. More specifically, in the illustrated case (FIG. 2), adjust a buffering time of data to be sent to the radio base station 3-1 according to the above-described amount of change in difference with the radio base station 3-2 whose amount of delay is relatively large as a reference.

Figure 5:
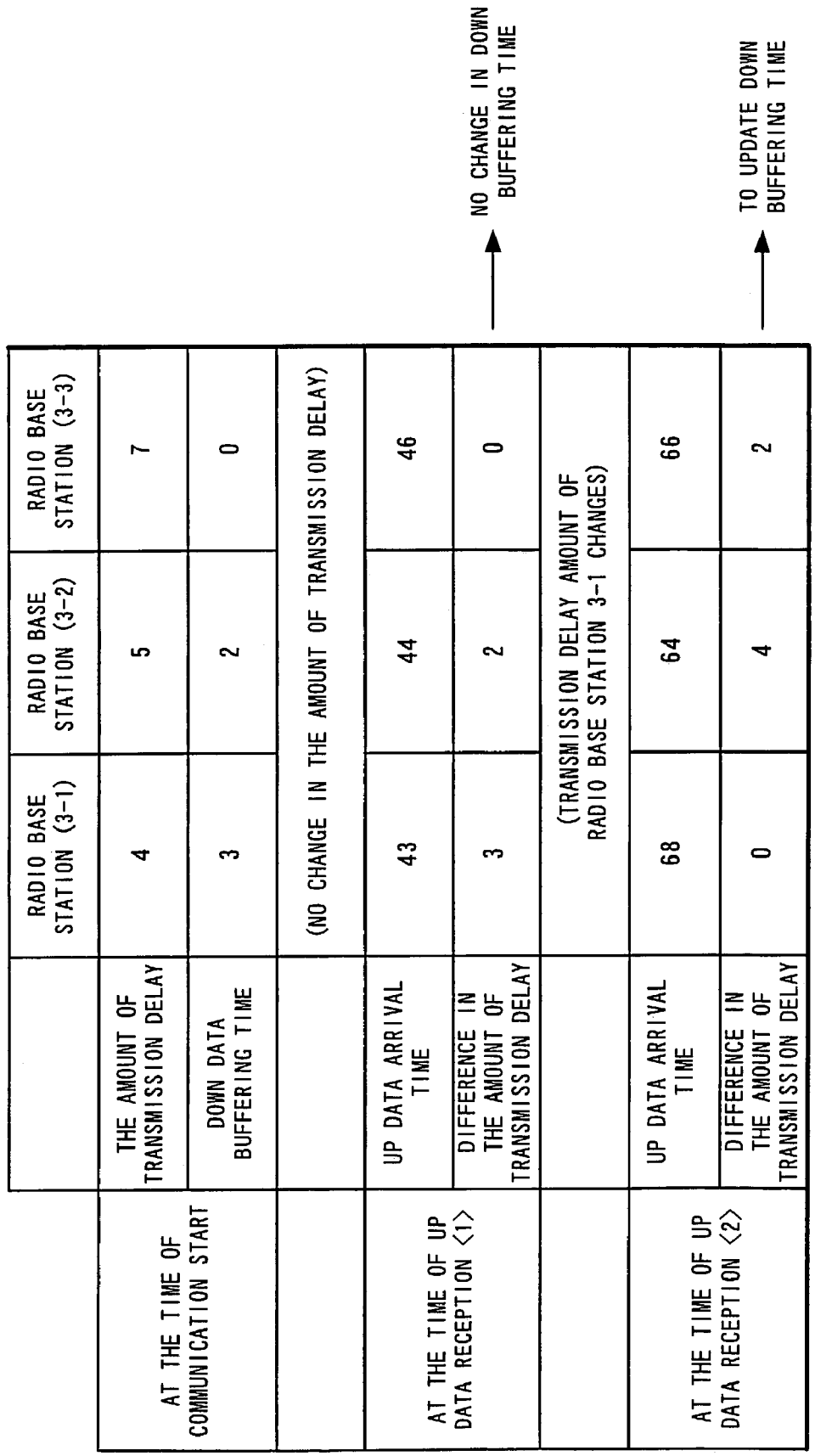
FIG. 5 is a diagram for use in explaining an example of timing modification according to a change of the amount of transmission delay between a base station control device and one radio base station.

FIG. 5 is a diagram for use in explaining an example where timing is modified according to a change of the amount of transmission delay between the base station control device 2 and one radio base station (3-1 in this case).

First, at the time of communication start, the base station control device 2 transmits a test request for confirming the amount of transmission delay to all the radio base stations 3 (3-1, 3-2 and 3—3) to be used.

Upon receiving the test request, each of the radio base stations 3-1, 3-2 and 3—3 immediately returns a test response to the base station control device 2 without conducting any processing.

Upon receiving the response from each of the radio base stations 3-1, 3-2 and 3—3, the base station control device 2 calculates the amount of transmission delay from a time cost from the transmission of the test data until the reception of the response.

Next, with the radio base station whose amount of transmission delay is the largest as a reference, calculate a buffering time from reception of down data until transmission to the radio base station to make the time of down data arrival at each radio station be the same. Assuming, for example, that the amount of transmission delay of the radio base station 3-1 is 4, that of the radio base station 3-2 is 5 and that of the radio base station 3—3 is 7, with the radio base station 3—3 whose amount of transmission delay is the largest as a reference, set a buffering time of the radio base station 3—3 to be zero (substantially zero or extremely short), that of the radio base station 3-2 to be 2 (i.e. 7−5) and that of the radio base station 3-1 to be 3 (i.e. 7−4) to absorb differences in transmission delays of the respective radio base stations 3-1, 3-2 and 3—3 by the buffering times.

In other words, based on each of calculated amounts of transmission delays, with the above-described one radio base station whose amount of transmission delay is the largest as a reference, calculate a transmission data buffering time to be applied to each radio base station to be substantially zero or extremely short for the one radio base station and for each of the other radio base stations, calculate the time to be a finite value conforming to a relative relationship with the above-described amount of transmission delay of the above one radio base station.

Since the difference in the amount of transmission delay is absorbed by a buffering time after the reception of down data, data reception time of each radio base station will be the same.

In a case where the amount of transmission delay between the radio base station 3 and the base station control device 2 remains unchanged during communication, communication can be continued without changing a buffering time, while in a case where the amount of transmission delay changes due to handover or the like, a buffering time of the base station control device should be modified.

Process of modifying a down data buffering time when the amount of transmission delay of the radio base station 3-1 changes (at the time of up data reception) is shown in FIG. 5. Since up data reception time <1> comes before the amount of transmission delay changes, the difference in the amount of transmission delay is the same as that at the time of communication start, so that the down data buffering time needs not to be changed.

Since at the up data reception time <2>, the amount of transmission delay change to have the difference in the amount of transmission delay changing from that at the time of communication start, update the down data buffering time.

Figure 6:
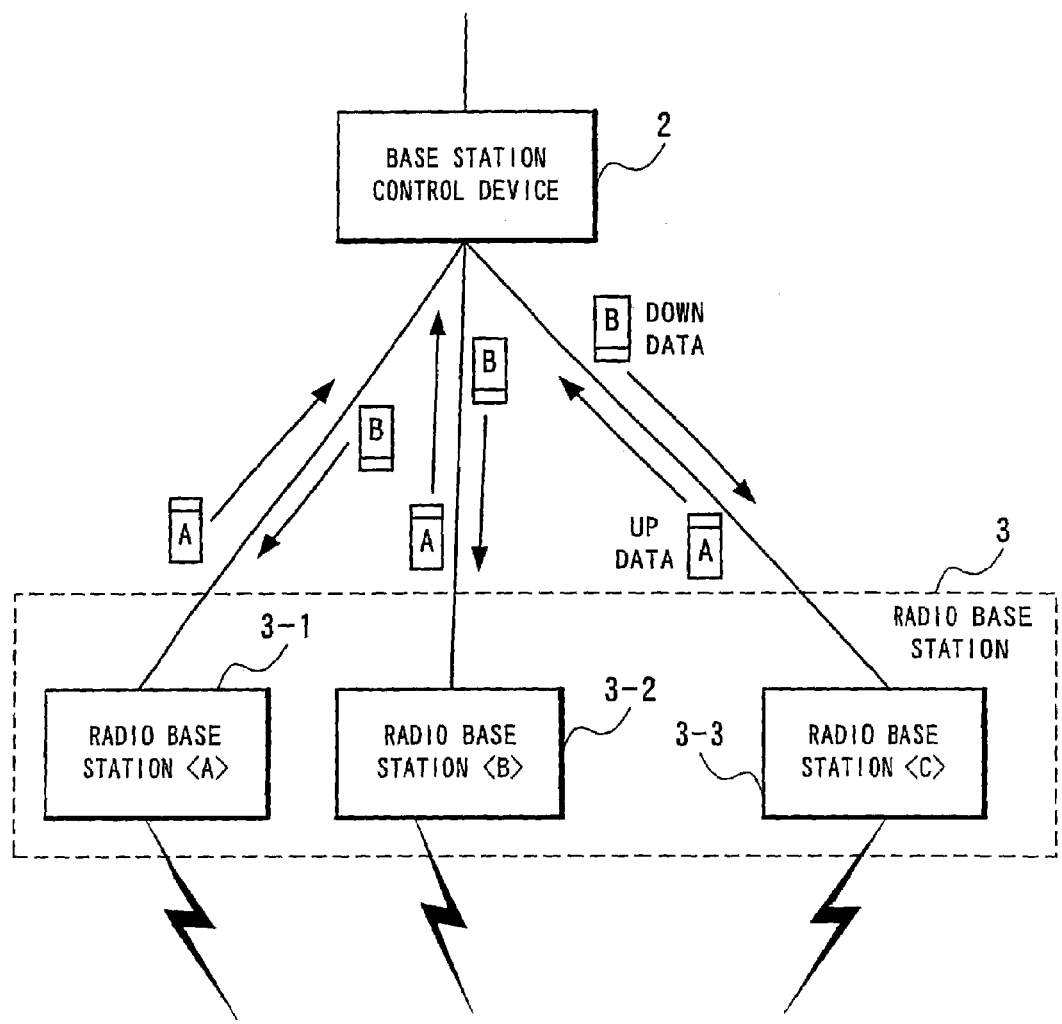
FIG. 6 is a conceptual diagram showing a general relationship between a radio base station and a base station control device common to the system according to the present invention.
Figure 13:
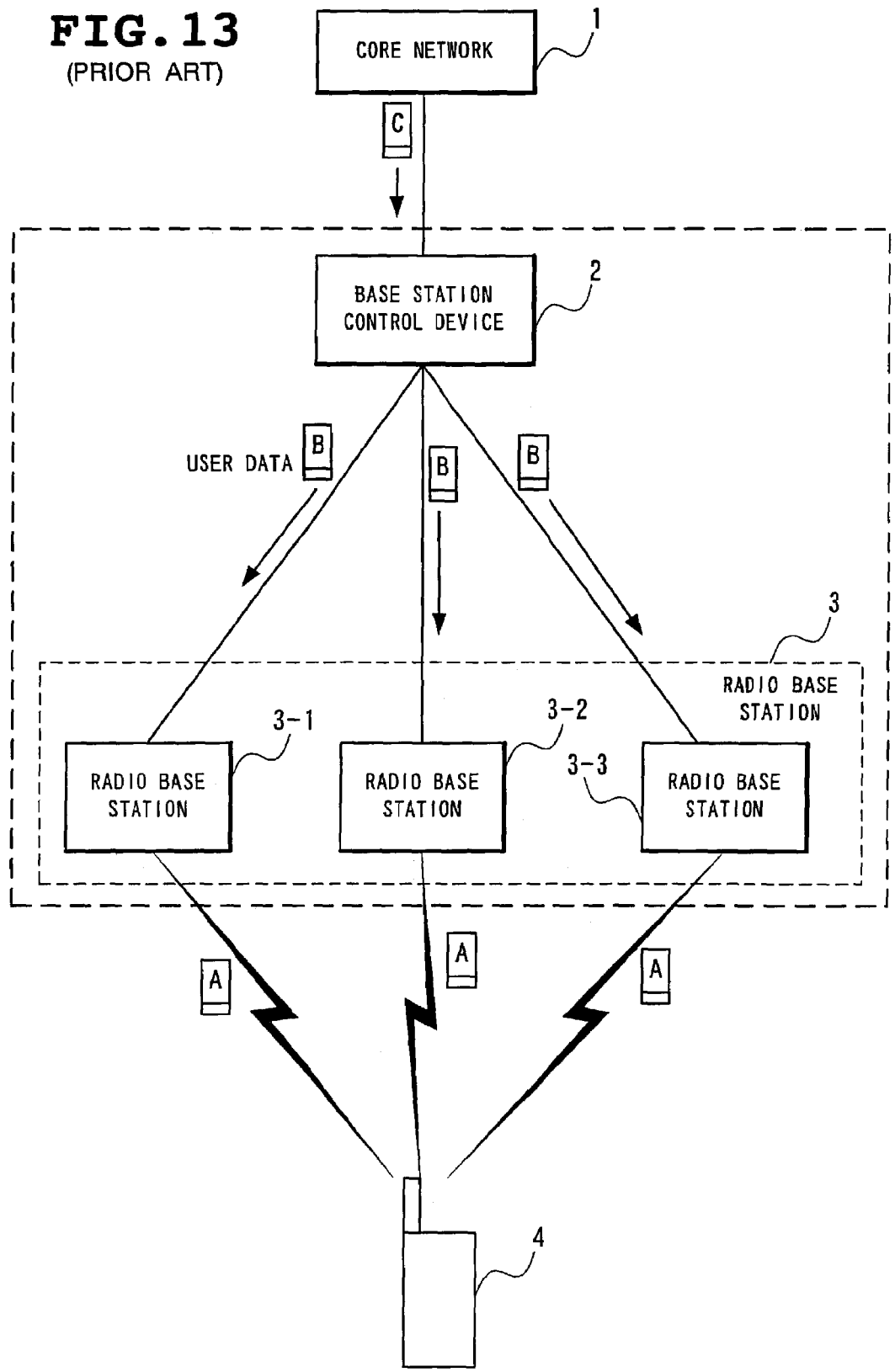
FIG. 13 is a conceptual diagram showing a relationship among a base station control device, a radio base station and a terminal in a common mobile communication system.
Figure 14:
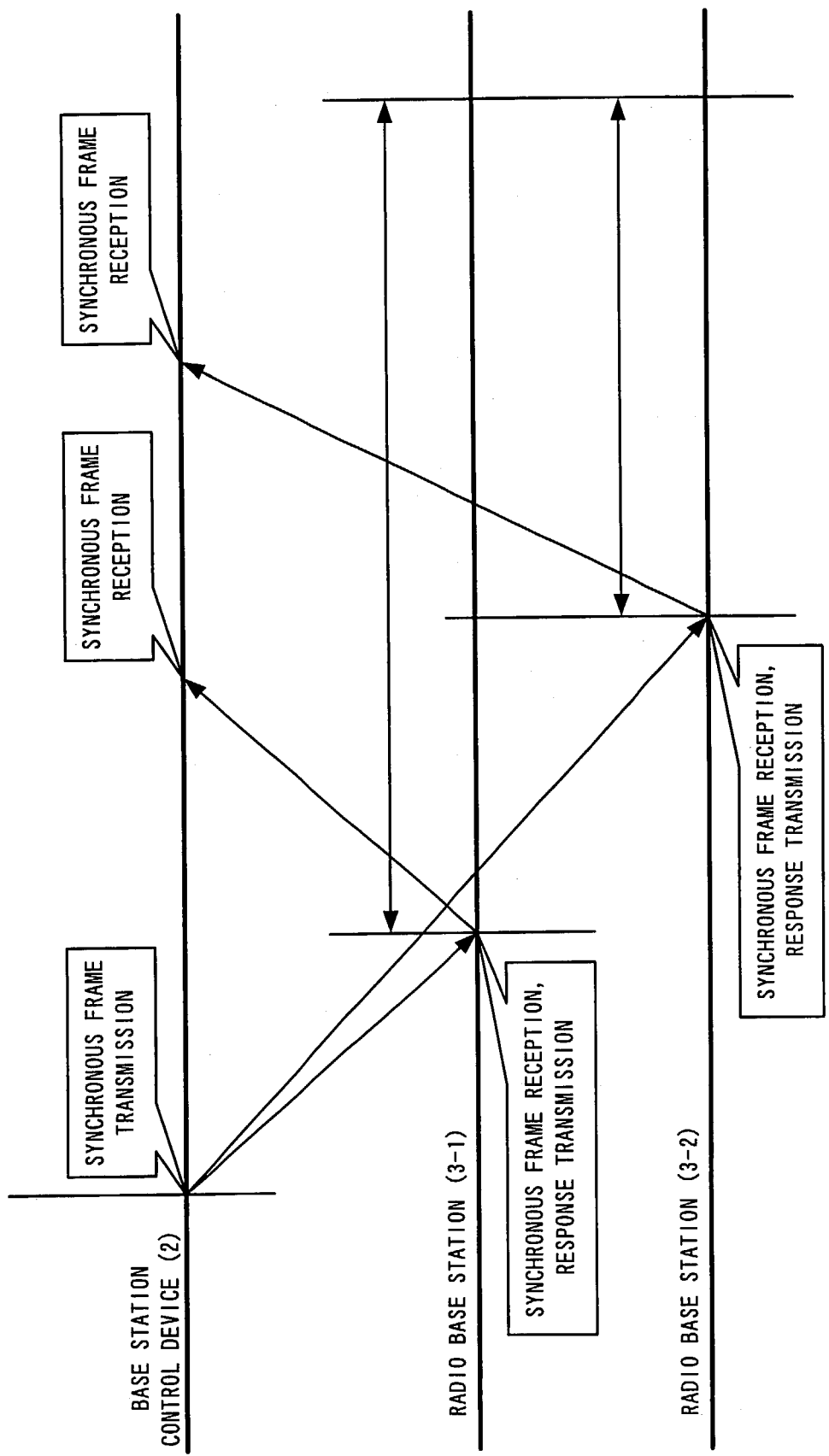
FIG. 14 is a timing chart showing a conventional timing control method at the time of communication start.
Figure 15:
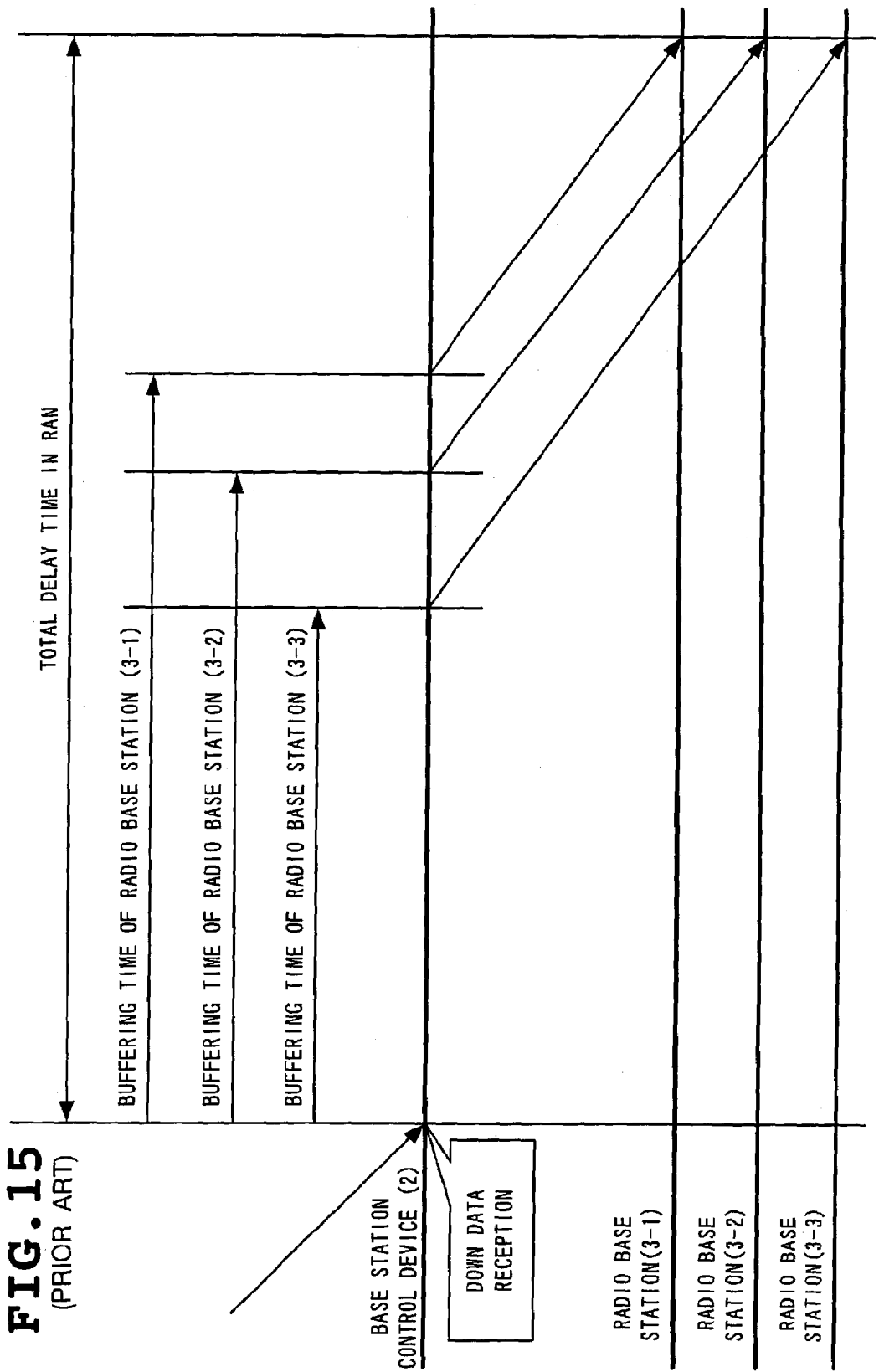
FIG. 15 is a timing chart showing timing of user data transmission to each radio base station at the time of down frame reception in a conventional method.
Figure 16:
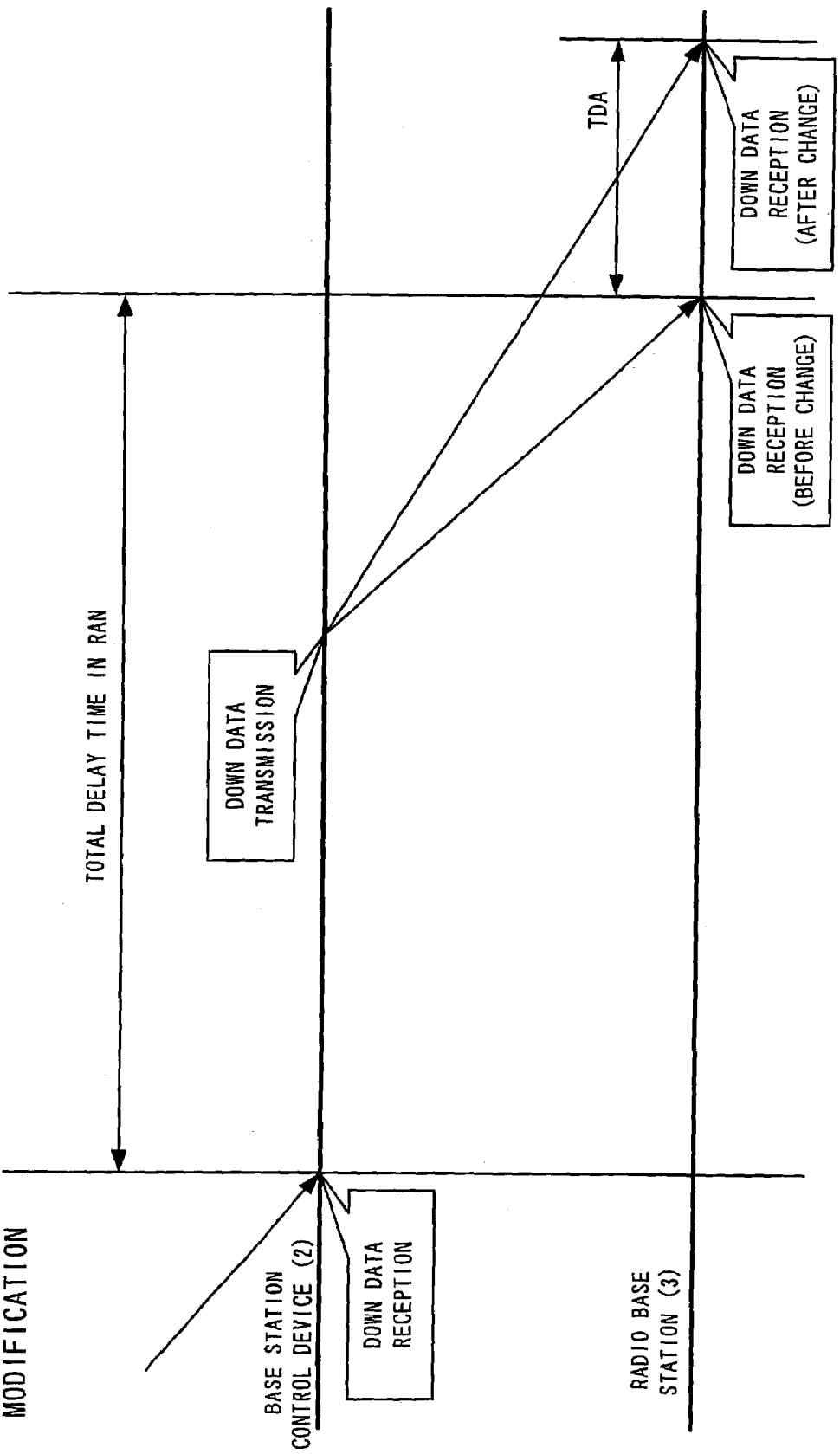
FIG. 16 is a timing chart showing a conventional timing control method at the time of timing modification.
Figure 17:
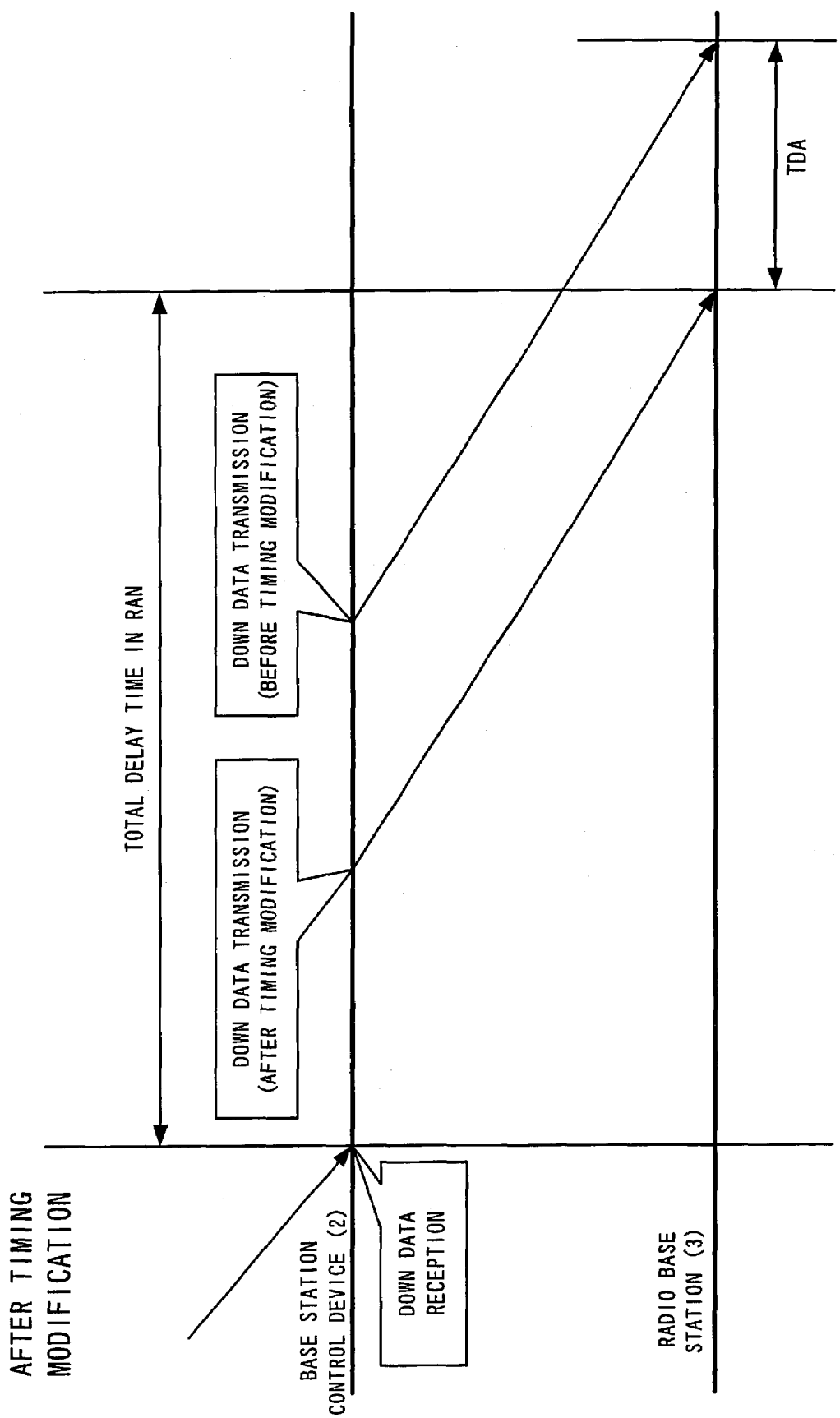
FIG. 17 is a timing chart showing the conventional timing control method at the time of timing modification.

FIG. 6 is a conception diagram showing a general relationship between a general radio base station and a base station control device common to the system according to the present invention. In the figure, most parts are common to those shown in FIG. 13 which have been already described. Illustrated is how up data (A) and down data (B) are transmitted and received between the radio base station and the base station control device.

Figure 7:
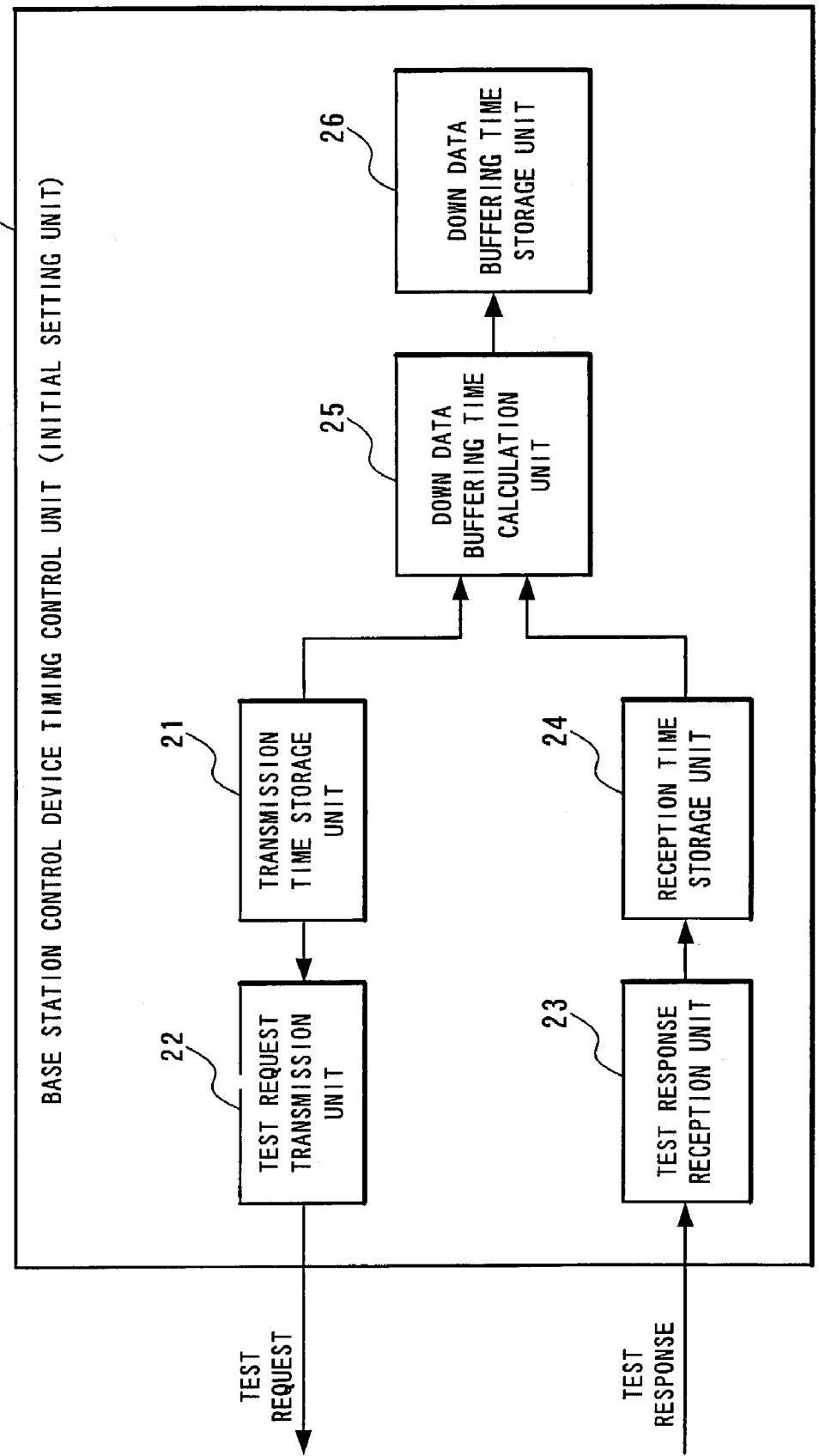
FIG. 7 is a block diagram showing a timing control function (initial setting unit) of the base station control device.
Figure 8:
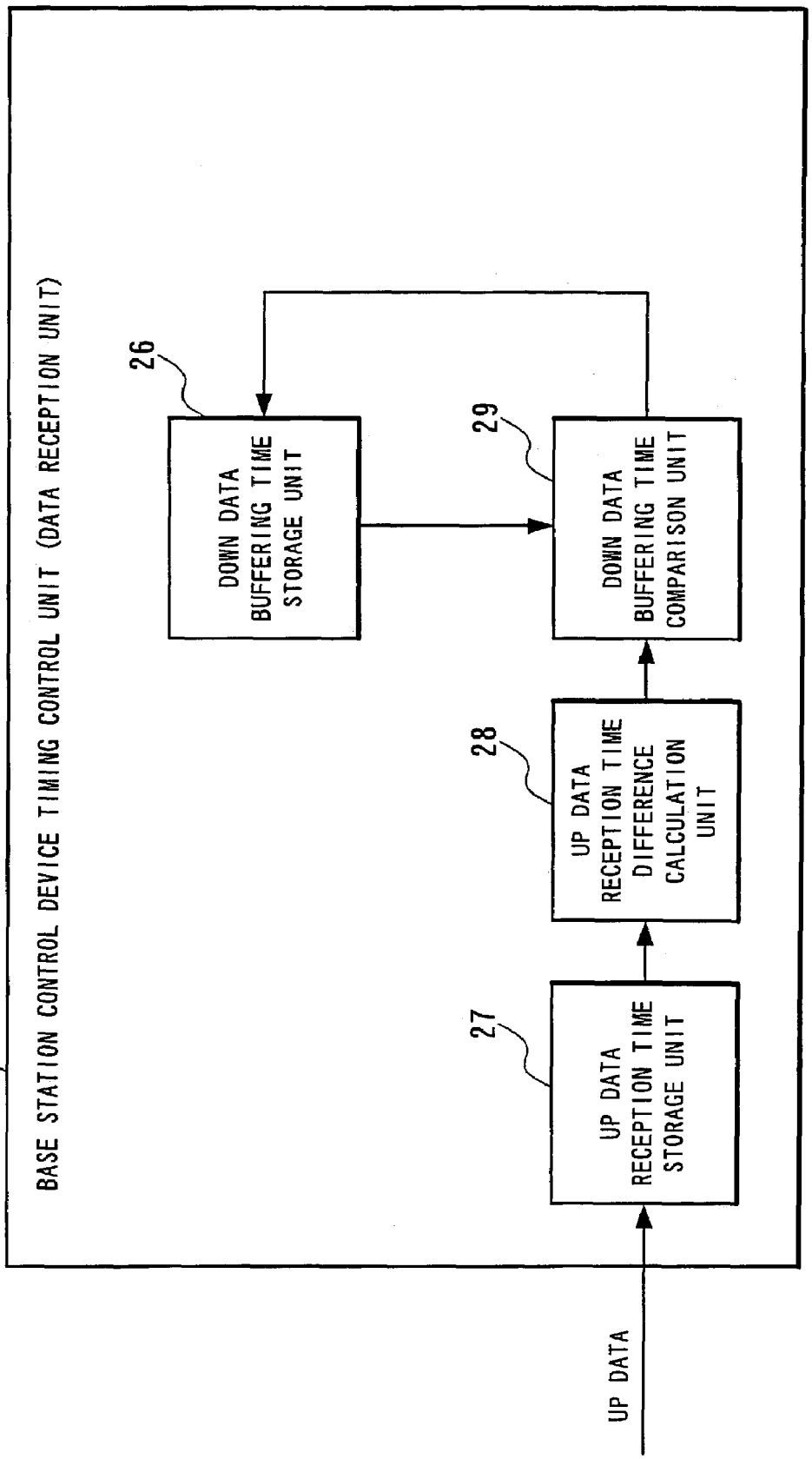
FIG. 8 is a block diagram showing a timing control function (data reception unit) of the base station control device.

FIGS. 7 and 8 are block diagrams showing a timing control function of the base station control device, with FIG. 7 being a functional block diagram of an initial setting unit 2A for use in calculating a down data buffering time at the time of communication start. At the time of starting communication, the base station control device preserves a test request transmission time in a transmission time storage unit 21 and at the same time transmits a test request to the radio base station by means of a test request transmission unit 22. As is already described, upon receiving the test request, the radio base station immediately transmits a test response. The initial setting unit 2A of the base station control device receives the test response at a test response reception unit 23 and at the same time preserves a test response reception time in a reception time storage unit 24. When reception of test responses from all the radio base stations is completed, based on the test request transmission time and the test response reception time of each radio base station, a down data buffering time calculation unit 25 calculates a buffering time of down transmission data to each radio base station. The calculation result is preserved in a down data buffering time storage unit 26. Upon receiving down data, the base station control device determines timing of transmission of the down data to each radio base station based on the buffering time preserved in the down data buffering time storage unit 26.

FIG. 8 is a functional block diagram of a data reception unit 2B for use in updating a down data buffering time when receiving up data. Upon receiving up data from each radio base station, the base station control device preserves a data reception time in an up data reception time storage unit 27. When arrival of the data from all the radio base stations is completed, an up data reception time difference calculation unit 28 calculates a difference in time of receiving up data from each radio base station with the latest up data reception time as a reference time. When the difference calculation is completed, a down data buffering time comparison unit 29 compares the difference calculated this time and the down data buffering time preserved in the down data buffering time storage unit 26 which has been already described with reference to FIG. 7. When the compared results fail to coincide with each other, store the difference calculated this time in the down data buffering time storage unit 26.

Figure 9:
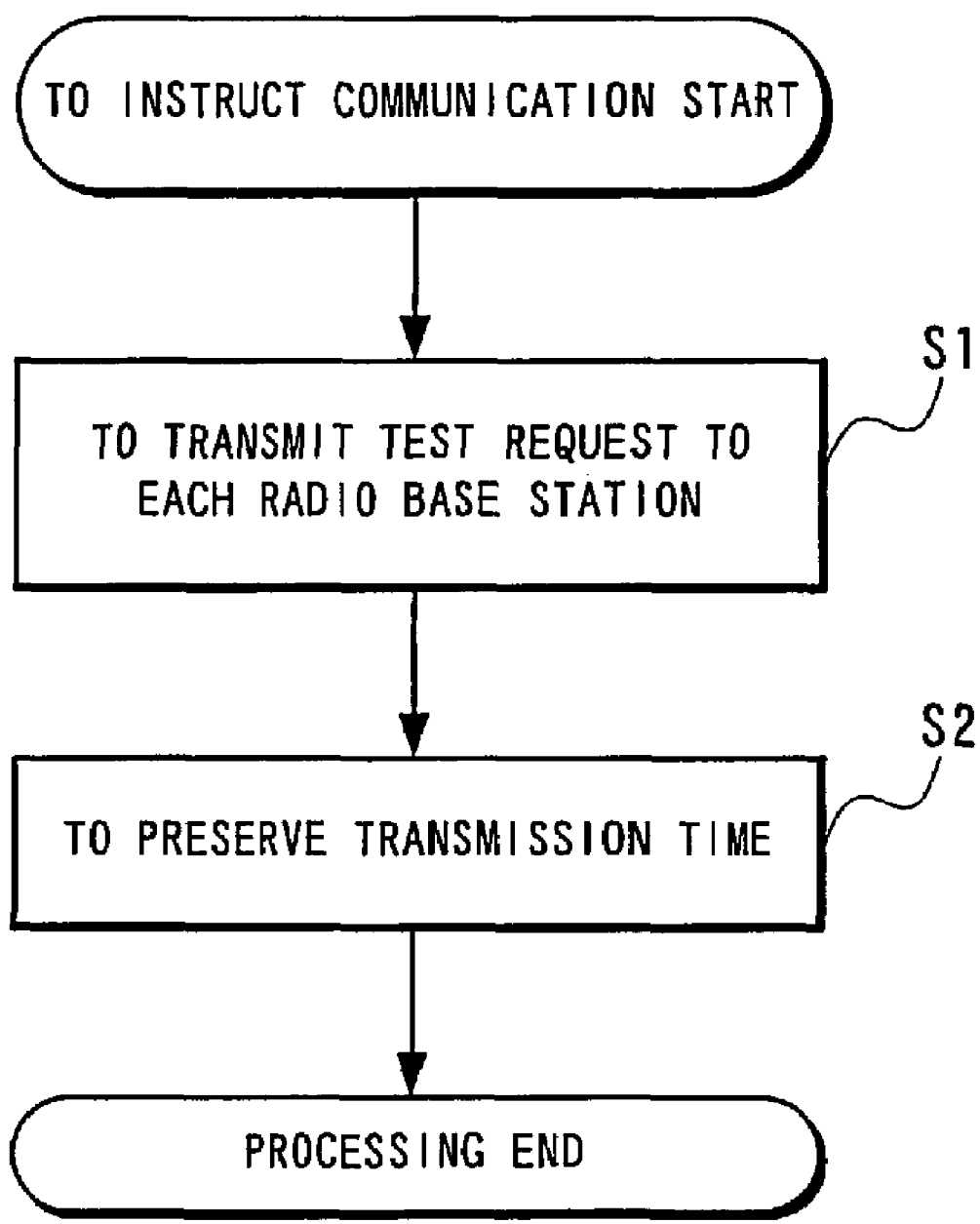
FIG. 9 is a flow chart showing an operation flow of the base station control device at the time of test request transmission.
Figure 10:
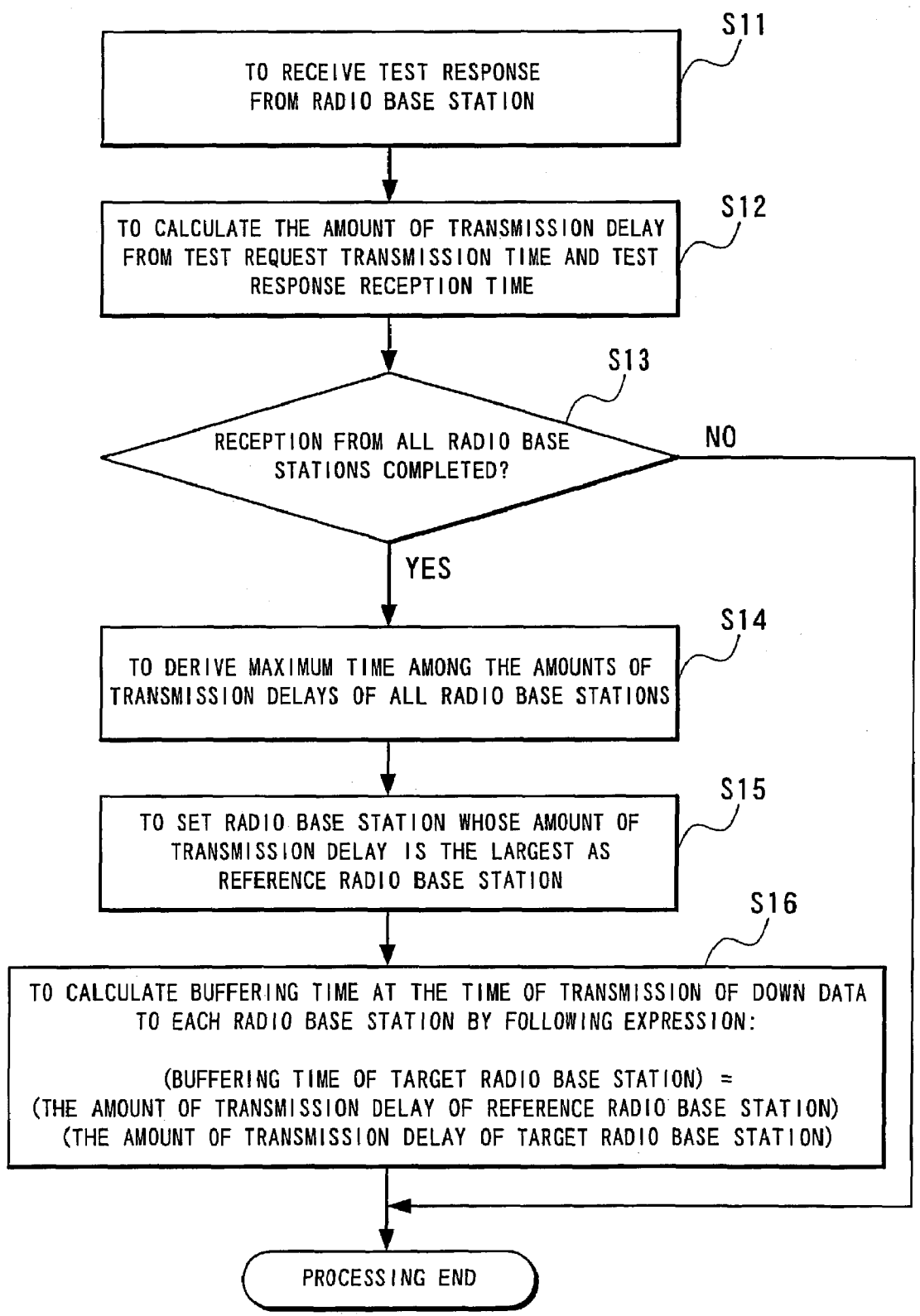
FIG. 10 is a flow chart showing an operation flow of the base station control device at the time of test response transmission.
Figure 11:
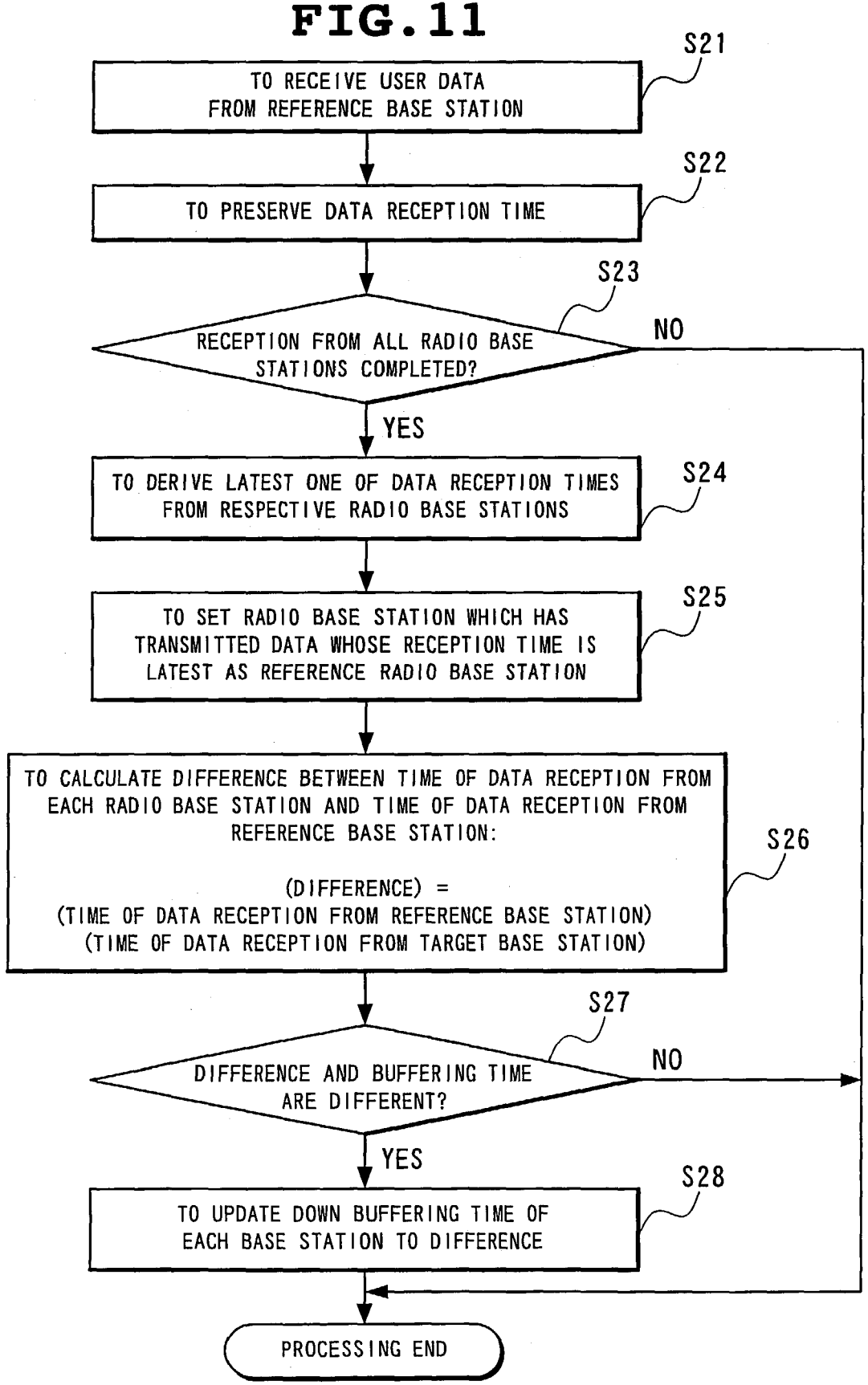
FIG. 11 is a flow chart showing an operation flow of the base station control device at the time of up data reception.

FIG. 9 is a flow chart showing an operation flow of the base station control device at the time of test request transmission. FIG. 10 is a flow chart showing an operation flow of the base station control device at the time of test response transmission. FIG. 11 is a flow chart showing an operation flow of the base station control device at the time of up data reception.

As illustrated in the flow chart of FIG. 9, at the time of starting communication, the base station control device transmits a test request to each radio base station (Step 1) and preserves a transmission time (Step S2).

As illustrated in the flow chart of FIG. 10, upon receiving a response from the radio base station (Step S11), the base station control device derives the amount of transmission delay between the radio base station and the base station control device from a time cost from the test request transmission until the test response reception (Step S12). Although the method of deriving the amount of transmission delay depends on a transmission medium and data processing characteristics of the radio base station, when the amount of up direction transmission delay and the amount of down direction transmission delay are equal, the amount of down direction transmission delay can be obtained by the following expression:

(the amount of transmission delay)=(time from test request transmission until test response reception)/2.

When the amounts of up and down direction transmission delays differ from each other, derive the amounts of transmission delays by a calculation method according to their characteristics.

When reception of the test responses from all the radio base stations is completed (Step S13), with a radio base station whose amount of transmission delay is the largest as a reference radio base station (Steps S14 and S15), calculate a down buffering time for each radio base station by the following expression (Step S16):

(down buffering time of the target radio base station)
=(the amount of transmission delay of the reference base station)−(the amount of transmission delay of the target base station).

According to the above-described expression, a down buffering time for the radio base station whose amount of transmission delay is the largest will be zero and a down buffering time for each of the other radio base stations will have a larger value as its amount of transmission delay becomes smaller. As a result, all the radio base stations simultaneously receive the down data.

In addition, as illustrated in FIG. 11, after the communication starts, the base station control device recalculates a down data buffering time based on the time of arrival of up data from each radio base station.

First, receive user data from the reference base station (Step S21) and when receiving up data from the radio base station, the base station control device preserves the reception time in an internal memory (Step S22). When the reception of the up data from all the radio base stations is completed (Step S23), with the radio base station which has transmitted data whose reception time is the latest as a reference radio base station (Steps S24 and S25), calculate a data reception time difference (Step S26):

(data reception time difference)=(time of data reception from the reference base station)−(time of data reception from the target base station).

Compare the difference calculated by the above-described expression and a down data buffering time with respect to each of all the radio base stations (Step S27) and when they fail to coincide with each other, update the down data buffering time to be the difference calculated by the above expression (Step S28).

According to the present invention described in the foregoing, the following effects can be obtained. Since conventional systems in advance define a time from data reception by a base station control device until data transmission by a radio base station and determine a buffering time of the base station control device based on the defined time, data should be buffered for a long period of time at the base station control device, while the present invention enables a data buffering time of the base station control device to be minimized by monitoring time of up data reception from each radio base station all the time. This mitigates a load of the base station control device to suppress an increase in the scale of the device, as well as enabling reduction in the amount of transmission delay in the system as a whole, thereby realizing high-speed and comfortable communication.

Furthermore, in the conventional systems, the radio base station monitors a down data reception time and when the data is not received at an expected time, makes a request for down data transmission timing modification to the base station control device, thereby realizing timing control, while according to the present invention, the base station control device autonomously conducts down data timing control by using up data reception time, thereby simplifying timing control between the base station control device and the radio base station.

Figure 12:
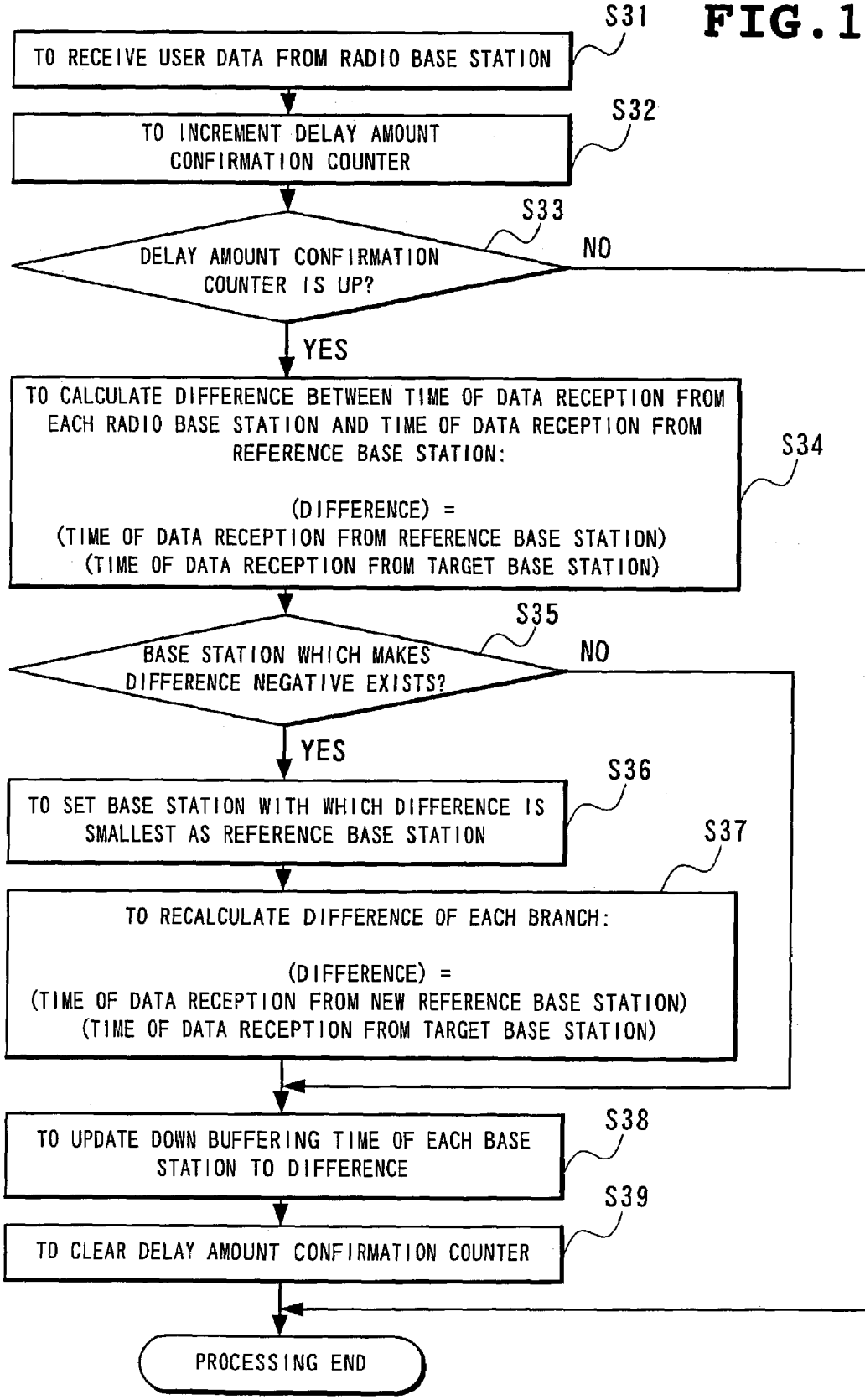
FIG. 12 is a flow chart for use in explaining another mode of implementation of the present invention.

FIG. 12 is a flow chart for use in explaining another mode of implementation of the present invention. Although in the above-described mode of implementation, timing modification can be conducted timely because up data is monitored all the time, while it is probable that a processing capacity of the base station control device will be reduced. As a method of avoiding such a probability, the method of, not monitoring up data all the time but monitoring the same in a fixed cycle is the mode of implementation shown in FIG. 12.

Receive user data from the radio base station (Step S31) and upon receiving up data, the base station control device increments a delay amount confirmation counter (Step S32). Thereafter, compare the counter with a confirmation cycle (Step S33) and when they coincide with each other, recalculate a down data buffering time (Steps S34 to S38) to clear the delay amount confirmation counter (Step S39). When they fail to coincide with each other, conduct no processing.

Since too short a confirmation cycle will cause reduction in a processing capacity of the base station control device and too long a confirmation cycle will delay detection of a change of the amount of transmission delay, it is preferable that an appropriate cycle is determined according to the system. On the other hand, in a system in which up data transmission is not periodically conducted to have a probability that no up data will be transmitted for a long period of time, test data for confirming the amount of transmission delay needs to be transmitted periodically in an up direction.

According to the present invention, it is possible to provide a mobile communication system, a base station control device and a radio base station forming the system, and a communication timing control method in the system which enable an increase in load and scale of the base station control device to be suppressed, as well as enabling reduction in a user data transmission time in the system as a whole by reducing a data buffering time in the base station control device.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A mobile communication system in which user data from a core network is received by a base station control device, the received user data is transmitted from said base station control device to a plurality of radio base stations and the user data is sent out by radio from these plurality of radio base stations to transmit said user data to a mobile terminal from the relevant radio base station, wherein said base station control device is structured to, at the time of communication start, transmit test data to each said radio base station, receives, from each radio base station, a response signal related to the transmitted test data, based on time of said transmission and time of reception of each response from each said radio base station, calculate the amount of transmission delay corresponding to a data transmission time between its own device and each radio base station in question and based on each calculated amount of transmission delay, with one radio base station whose said amount of transmission delay is the largest as a reference, calculate a transmission data buffering time to be applied to each radio base station to be substantially zero or extremely short for the one radio base station in question and to be a finite value conforming to a relative relationship with said amount of transmission delay of said one radio base station for each of the other radio base stations, at the time of transmitting down data supplied from said core network, transmit the data to each corresponding radio base station with each said calculated buffering time applied, and at the time of receiving up data from each said radio base station, based on a change of a difference in time of data reception from each radio base station, adjust a buffering time to be applied, and each said radio base station is structured to, at the time of communication start, upon receiving the test data from said base station control device, transmit the response signal to the base station control device in question with substantially no delay.

2. The mobile communication system as set forth in claim 1, wherein said base station control device executes adjustment of a buffering time all the time which is conducted based on a change of a difference in time of data reception from each radio base station when receiving up data from each said radio base station.

3. The mobile communication system as set forth in claim 1, wherein said base station control device executes adjustment of a buffering time in a fixed cycle which is conducted based on a change of a difference in time of data reception from each radio base station when receiving up data from each said radio base station.

4. A base station control device forming a mobile communication system designed such that user data from a core network is received by the base station control device, the received user data is transmitted from said base station control device to a plurality of radio base stations and the user data is sent out by radio from these plurality of radio base stations to transmit said user data to a mobile terminal from the relevant radio base station, which is structured to:

at the time of communication start, transmit test data to each said radio base station, receive, from each radio base station, a response signal related to the transmitted test data, based on time of said transmission and time of reception of each response from each said radio base station, calculate the amount of transmission delay corresponding to a data transmission time between its own device and each radio base station in question and based on each calculated amount of transmission delay, with one radio base station whose said amount of transmission delay is the largest as a reference, calculate a transmission data buffering time to be applied to each radio base station to be substantially zero or extremely short for the one radio base station in question and to be a finite value conforming to a relative relationship with said amount of transmission delay of said one radio base station for each of the other radio base stations, at the time of transmitting down data supplied from said core network, transmit the data to each corresponding radio base station with each said calculated buffering time applied, and at the time of receiving up data from each said radio base station, based on a change of a difference in time of data reception from each radio base station, adjust a buffering time to be applied.

5. The base station control device as set forth in claim 4, which executes adjustment of a buffering time all the time which is conducted based on a change of a difference in time of data reception from each radio base station when receiving up data from each said radio base station.

6. The base station control device as set forth in claim 4, which executes adjustment of a buffering time in a fixed cycle which is conducted based on a change of a difference in time of data reception from each radio base station when receiving up data from each said radio base station.

7. A radio base station forming a mobile communication system, wherein in said mobile communication system, user data from a core network is received by a base station control device, the received user data is transmitted from said base station control device to a plurality of radio base stations and the user data is sent out by radio from these plurality of radio base stations to transmit said user data to a mobile terminal from the relevant radio base station, said base station control device, at the time of communication start, transmits test data to each said radio base station, receives, from each radio base station, a response signal related to the transmitted test data, based on time of said transmission and time of reception of each response from each said radio base station, calculates the amount of transmission delay corresponding to a data transmission time between its own device and each radio base station in question and based on each calculated amount of transmission delay, with one radio base station whose said amount of transmission delay is the largest as a reference, calculates a transmission data buffering time to be applied to each radio base station to be substantially zero or extremely short for the one radio base station in question and to be a finite value conforming to a relative relationship with said amount of transmission delay of said one radio base station for each of the other radio base stations, at the time of transmitting down data supplied from said core network, transmits the data to each corresponding radio base station with each said calculated buffering time applied, and at the time of receiving up data from each said radio base station, based on a change of a difference in time of data reception from each radio base station, adjusts a buffering time to be applied, and the radio base station, at the time of communication start, upon receiving the test data from said base station control device, transmits the response signal to the base station control device in question with substantially no delay.

8. A communication timing control method in a mobile communication system structured such that user data from a core network is received by a base station control device, the received user data is transmitted from said base station control device to a plurality of radio base stations and the user data is sent out by radio from these plurality of radio base stations to transmit said user data to a mobile terminal from the relevant radio base station, comprising the steps of:

in said base station control device, at the time of communication start, transmitting test data to each said radio base station, in each said radio base station, upon receiving said test data, transmitting a response signal to said base station control device with substantially no delay, in said base station control device, receiving the response signal from each said radio base station, in said base station control device, based on time of said transmission and time of reception of each response from each said radio base station, calculating the amount of transmission delay corresponding to a data transmission time between its own device and each radio base station in question, in said base station control device, based on each calculated amount of transmission delay, with one radio base station whose said amount of transmission delay is the largest as a reference, calculating a transmission data buffering time to be applied to each radio base station to be substantially zero or extremely short for the one radio base station in question and to be a finite value conforming to a relative relationship with said amount of transmission delay of said one radio base station for each of the other radio base stations, in said base station control device, at the time of transmitting down data supplied from said core network, transmitting the data to each corresponding radio base station with each said calculated buffering time applied, and in said base station control device, at the time of receiving up data from each said radio base station, based on a change of a difference in time of data reception from each radio base station, adjusting a buffering time to be applied.

9. The communication timing control method as set forth in claim 8, wherein in said base station control device, when receiving up data from each said radio base station, the step of adjusting a buffering time to be applied based on a change of a difference in time of data reception from each radio base station is executed all the time.

10. The communication timing control method as set forth in claim 8, wherein in said base station control device, when receiving up data from each said radio base station, the step of adjusting a buffering time to be applied based on a change of a difference in time of data reception from each radio base station is executed in a fixed cycle.

* * * * *